(12) United States Patent
Wagner

(10) Patent No.: US 7,310,966 B2
(45) Date of Patent: Dec. 25, 2007

(54) UNIVERSAL DIRECT CURRENT BRUSHLESS AIR CONDITIONING SYSTEM

(76) Inventor: Harold Wagner, 4325 SW Country Place Rd., Palm City, FL (US) 34990

(*) Notice: Subject to any disclaimer, the term of this patent is extended or adjusted under 35 U.S.C. 154(b) by 170 days.

(21) Appl. No.: 11/137,664

(22) Filed: May 25, 2005

(65) Prior Publication Data

US 2006/0179871 A1 Aug. 17, 2006

Related U.S. Application Data

(63) Continuation-in-part of application No. 10/758,728, filed on Jan. 16, 2004, now abandoned.

(51) Int. Cl.
*F25D 19/00* (2006.01)
*F25D 17/06* (2006.01)

(52) U.S. Cl. .......................... 62/298; 62/411

(58) Field of Classification Search .................. 62/89, 62/129, 179, 180, 186, 227, 228.4, 262, 298, 62/411; 454/201
See application file for complete search history.

(56) References Cited

U.S. PATENT DOCUMENTS

| | | | | |
|---|---|---|---|---|
| 2,187,061 A | * | 1/1940 | Smith | 62/209 |
| 2,420,939 A | * | 5/1947 | Eberhart | 62/317 |
| 2,545,491 A | * | 3/1951 | Ohlheiser | 165/229 |
| 5,241,832 A | * | 9/1993 | Nekola | 62/117 |
| 5,379,609 A | * | 1/1995 | Matsumoto et al. | 62/262 |
| 5,634,352 A | * | 6/1997 | Nagai et al. | 62/324.6 |
| 5,675,976 A | * | 10/1997 | Tobi et al. | 62/180 |
| 5,913,890 A | * | 6/1999 | Lee et al. | 62/186 |
| 2002/0017108 A1 | * | 2/2002 | Schooley | 62/240 |

FOREIGN PATENT DOCUMENTS

JP 5-260695 A * 10/1993

* cited by examiner

*Primary Examiner*—Mohammad M. Ali
(74) *Attorney, Agent, or Firm*—Gold & Rizvi, P.A.; Glenn E. Gold; H. John Rizvi

(57) ABSTRACT

A universal direct current brushless air conditioning system preferably includes a blower unit and a compressor unit. The blower unit preferably includes an evaporator, at least one inlet fan, at least one outlet vent, a direct current controller, a thermostatic expansion valve and a mounting enclosure. The compressor unit preferably includes a compressor, a condenser, at least one exhaust fan and a mounting enclosure. The compressor includes a motor. Significantly, the inlet fans, the at least one exhaust cooling fan and the compressor motor are a DC brushless type for drawing less electrical power. The blower unit and compressor unit are connected to each other through any suitable tubing and wires. A reverse valve is preferably included to allow the universal direct current brushless air conditioning system to be used as a heat pump to output heat.

2 Claims, 4 Drawing Sheets

UNIVERSAL DIRECT CURRENT BRUSHLESS AIR CONDITIONING SYSTEM

CROSS-REFERENCE TO RELATED APPLICATIONS

This application is a continuation-in-part (CIP) of U.S. patent application Ser. No. 10/758,728, filed on Jan. 16, 2004 now abandoned.

BACKGROUND OF THE INVENTION

1. Field of the Invention

The present invention relates generally to air conditioning systems. More particularly, the invention relates to a direct current air conditioning system that incorporates all brushless-technology components. The system can be configured to incorporate a split air conditioning architecture or, alternatively, a unitary housed system. The system is particularly well suited for use to cool an open-air vehicle, such as a golf cart, boat cabin, or any other vehicle having an available power supply in the range of 9 to 600 volts DC.

2. Description of the Prior Art

Efficient and effective direct current air conditioning systems for small battery-powered vehicles have been developed in the past. However, the prior art direct current air conditioning systems have several drawbacks. Existing direct current air conditioning systems have poor overall cooling ability relative to the amount of power consumed. The direct current air conditioning systems also have been bulky, generally due to their containment within a single enclosure. Oftentimes, such single enclosure designs also require an added support structure due to weight concentration in a particular area.

Accordingly, there is an established need for a universal direct current air conditioning system, which incorporates all brushless-technology components to increase the efficiency of the air conditioning system, and which may be housed in two separate enclosures.

SUMMARY OF THE INVENTION

The invention is directed to a universal direct current brushless air conditioning system, which incorporates all brushless-technology components to increase the efficiency of the air conditioning system.

In one general aspect of the present invention, the universal direct current brushless air conditioning system includes a blower unit and a compressor unit.

In another aspect of the present invention, the universal direct current brushless air conditioning system includes at least one brushless direct current (DC) inlet fan, at least one brushless DC exhaust cooling fan, and a brushless DC compressor.

In a further aspect of the present invention, the universal direct current brushless air conditioning system includes a reversing valve to generate a heated air stream, as desired.

In a yet further aspect of the present invention, the universal direct current brushless air conditioning system includes a variable speed direct current controller for driving a motor of a hermetically sealed compressor, as well as one or more cooling fans. The cooling fans are not driven by the controller; instead, they incorporate two-phase motors which are supplied a source voltage through a rotary switch. As will be apparent to those skilled in the art, a three-phase fan could be used. In that case, it would require a controller.

These and other aspects, features, and advantages of the present invention will become more readily apparent from the attached drawing and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

Figure 1:
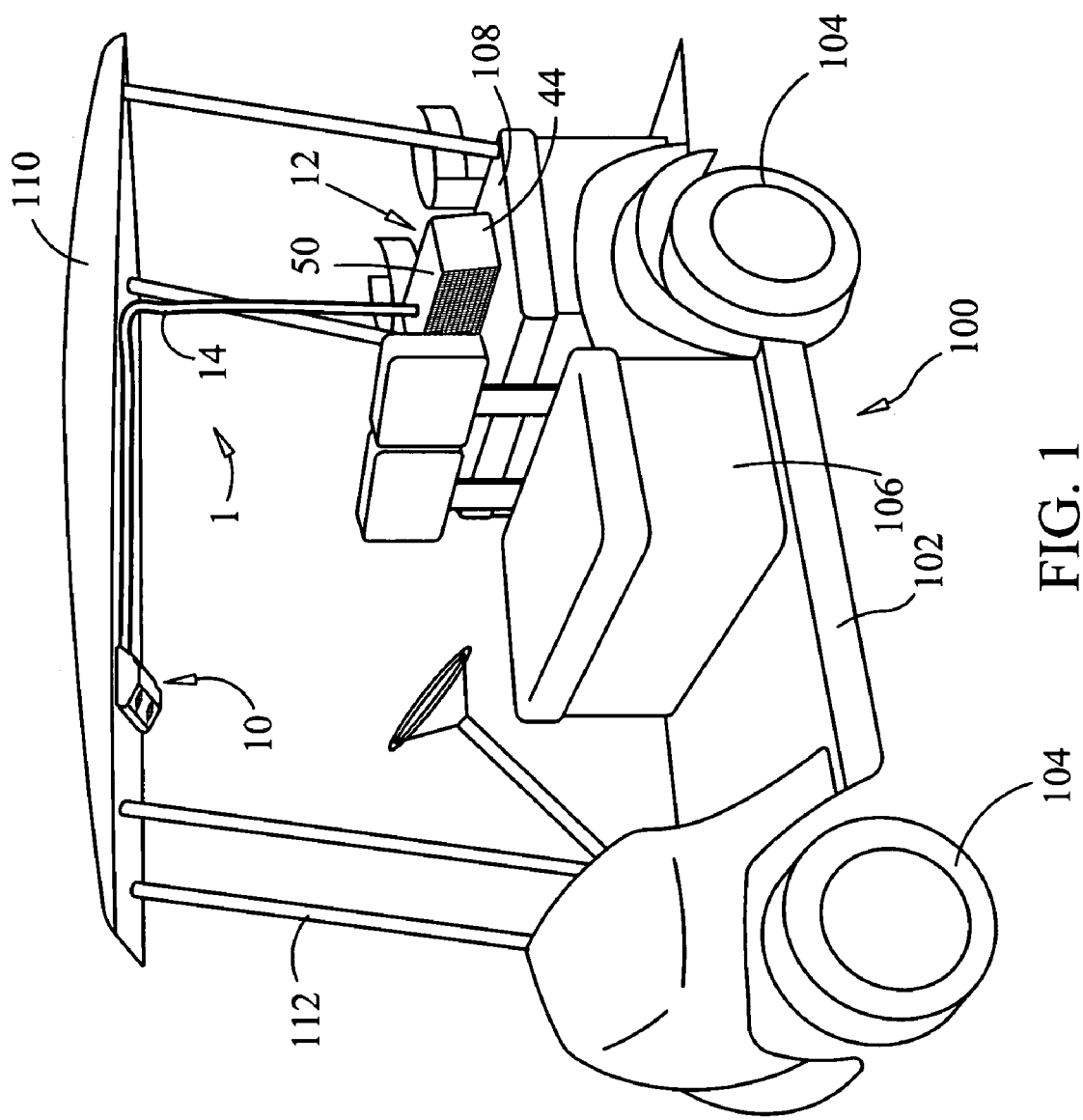
FIG. 1 is a perspective view of a golf cart incorporating a universal direct current brushless air conditioning system in accordance with the present invention.

Shown throughout the Figures, the present invention is generally directed to a universal direct current brushless air conditioning system 1. Referring briefly to FIG. 1, the universal direct current brushless air conditioning system 1 preferably includes a blower unit 10 and a compressor unit 12. In one exemplary application, the system is mounted within a golf cart 100, which includes a vehicle body 102, four wheels 104, a seat 106, a rear shelf 108 and a roof 110. A rechargeable battery, an alternator, or solar power may be used to power the universal DC brushless air conditioning system 1 in the golf cart 100. The four wheels 104 movably support the vehicle body 102. The seat 106 is attached to substantially a middle of the vehicle body 102. The rear shelf 108 is disposed behind the seat 106. The roof 110 is supported over the vehicle body 102 with a plurality of roof supports 112.

The blower unit 10 is preferably attached to an interior surface of the roof in front of the seat 106. The compressor unit 12 is preferably attached to an upper surface of the rear shelf 108. The blower enclosure 10 is connected to the compressor unit 12 with any suitable conduit 14, which may be flexible or rigid. In a preferred embodiment of the invention, for example, the conduit is comprised of a pair of flexible braided copper tubes, one of which is a pressure line and one of which is a suction line. Control wires (not shown) from the controller to the compressor, as well as source voltage wires, are wrapped up with the tubing.

Figure 2:
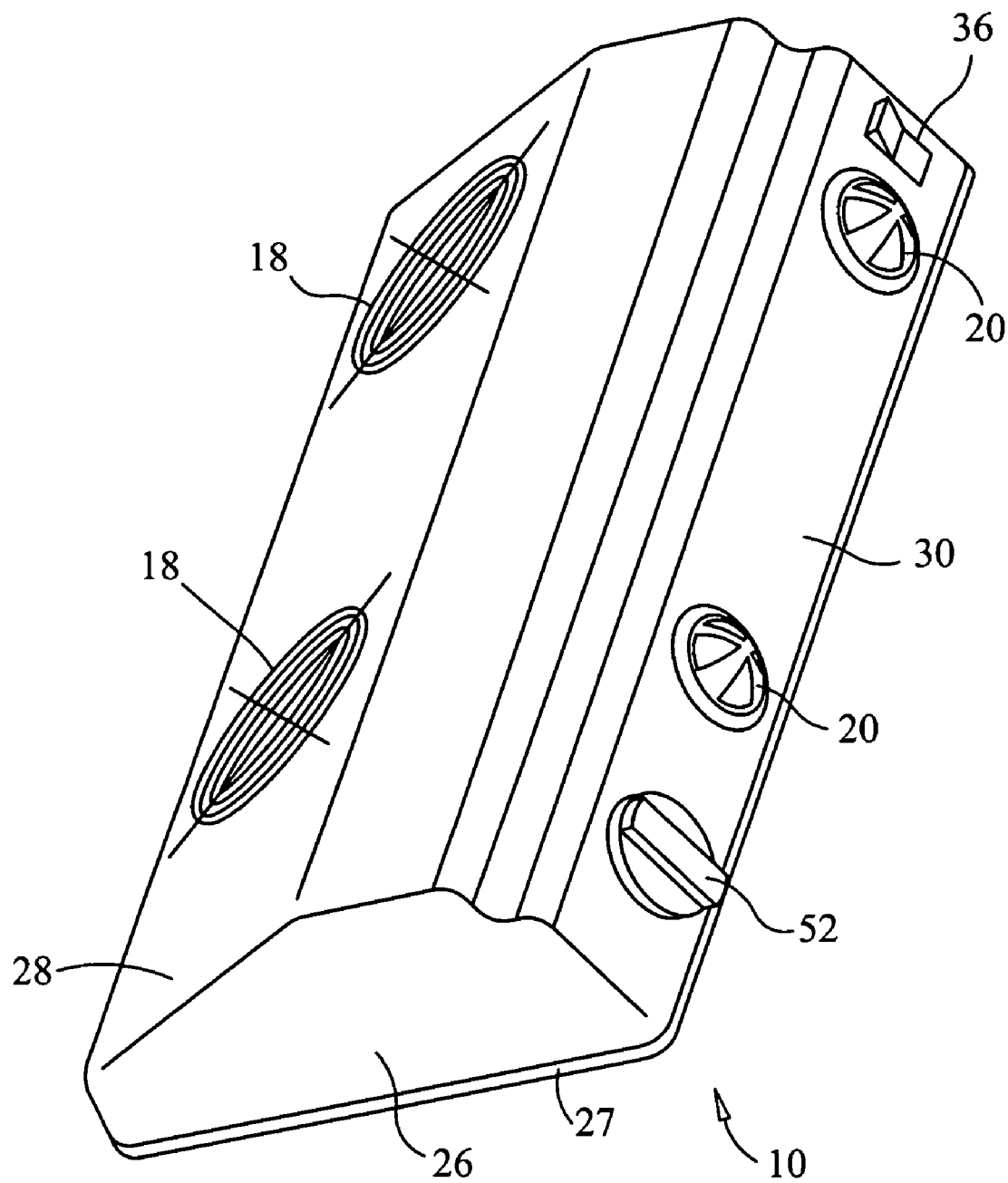
FIG. 2 is a perspective view of a blower unit of a universal direct current brushless air conditioning system, in accordance with the present invention.
Figure 3:
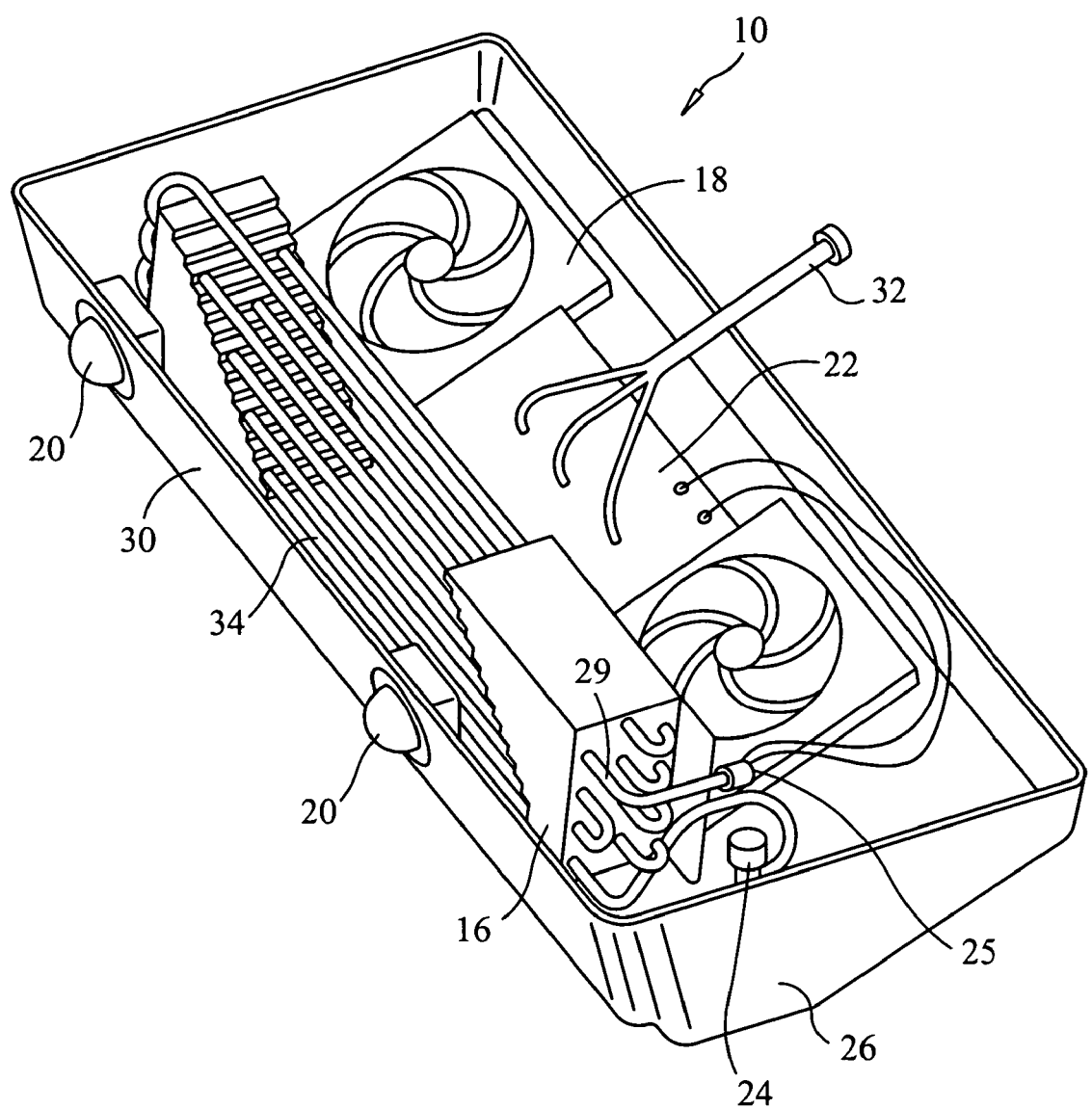
FIG. 3 is a top perspective view of the blower enclosure of FIG. 2, with a top cover panel removed.

Referring briefly to FIGS. 2-3, the blower unit 10 preferably includes an evaporator 16, two inlet fans 18, two outlet vents 20, a direct current controller 22, a thermostatic expansion valve 24, and a blower mounting enclosure comprised of a mounting cover 27 sealingly attached to a housing 26. The housing 26 of the blower enclosure preferably has a generally rectangular configuration, with a surface 28 tapering toward the front of the unit. A sealing mounting cover 27 is preferably adhesively attached about its periphery to a continuous edge defining an open side of the blower housing 26. Preferably, the sealing mounting cover 27 is in the form of a rigid material (e.g., folded steel sheet) having a rubber mat insulation, or other resilient expanse, over its top.

The inlet fans 18 are mounted to a backside of the tapered surface 28. Significantly, the inlet fans 18 are a brushless direct current type, which draw less electrical power than conventional fans incorporating non-brushless technology. The evaporator 16 is attached to an inside of the blower housing 26, adjacent to a rear end 30 thereof.

The direct current controller 22 is preferably mounted between the two inlet fans 18. The direct current controller 22 preferably runs a three-phrase brushless compressor motor. The director current controller 22 includes a wiring harness 32 for connection to the components in the compressor unit 12. The thermostatic expansion valve 24 is connected to the evaporator 16 on one end thereof. A thermostatic switch 25 (commonly referred to in the art as an "antifreeze switch") is attached to an outlet line 29 of the evaporator 16. The thermostatic switch 25 is electrically connected to the direct current controller 22. The thermostatic switch 25 signals the direct current controller 22 to turn off, if the evaporator 16 reaches a predefined minimum allowable temperature.

It is of the utmost importance that direct current brushless technology is used for all components having electric motors. Brushless technology enables increased efficiency over comparable non-brushless systems. The table below illustrates the efficiency of brushless systems, wherein Imax and Imin represent the minimum and maximum amperage draw, respectively, at various voltages.

TABLE 1

Efficiency of a 5000 BTU all-brushless system.

| V | Imax | Imin |
|---|------|------|
| 48 | $\leq 8$ | $\leq 6$ |
| 36 | $\leq 10$ | $\leq 8$ |
| 24 | $\leq 13$ | $\leq 12$ |
| 12 | $\leq 29$ | $\leq 24$ |

The outlet vents 20 are mounted in the rear end 30. The outlet vents 20 are preferably directionally adjustable to allow cold air to be blown in the direction of the occupants of the vehicle. A top of the blower enclosure 10 is preferably mounted to a flat surface to seal the cold air produced by the plurality of coils 34 of the evaporator 16. However, as will be apparent to those skilled in the art, the top of the blower enclosure 10 could be adapted to be mounted to a non-flat surface as well. Air is drawn through the tapered surface 28 by the two inlet fans 18, and blown across the plurality of coils 34 through the two outlet vents 20. A high-low switch 36 preferably controls the speed of the inlet fans 18, but other types of switches may also be used.

Figure 4:
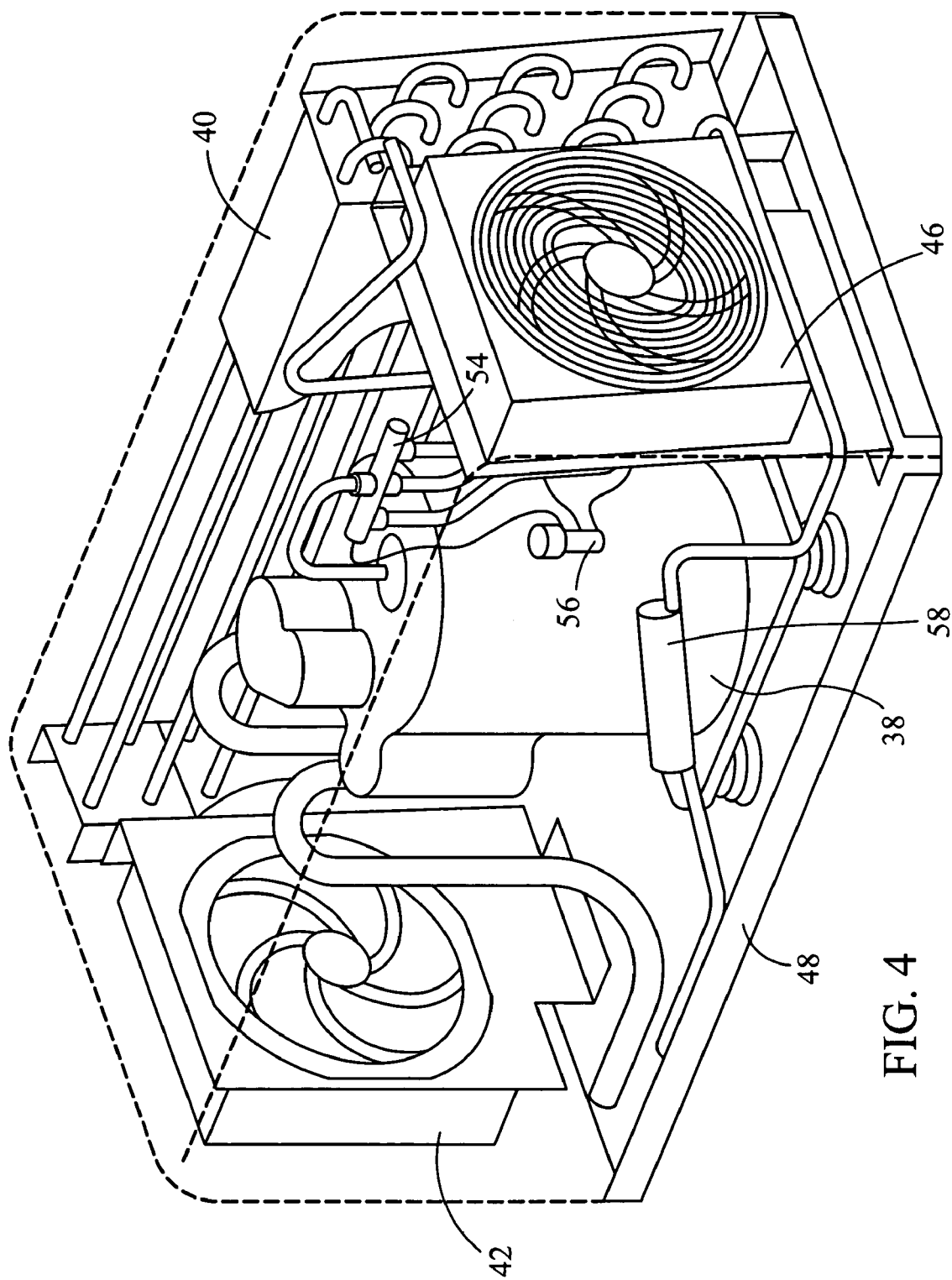
FIG. 4 is a perspective view of a compressor unit (cover removed) of a universal direct current brushless air conditioning system, in accordance with the present invention.

Referring briefly to FIG. 4, the compressor unit preferably includes a compressor 38, a condenser 40, at least one exhaust fan 42 and a compressor mounting enclosure 44. The compressor mounting enclosure 44 includes a base 48 and a cover 50. The cover 50 is attached to the base 48 with fasteners or the like. The first exhaust fan 42 is mounted to one end of the base 48 and a second exhaust fan 46 is preferably mounted to the opposite end of the base 48. The compressor 38 is mounted between the exhaust fans 42, 46. Fans 18, 42, 46 could be any brushless motor fan/blower mechanism including, but not limited to, squirrel cage fan, impeller fan or any other suitable type of fan.

The compressor 38 is preferably hermetically sealed and includes a brushless DC motor. The brushless DC motor is driven by a direct current controller 22. The cooling fans are not driven by the controller 22; instead, they incorporate two-phase motors which are supplied a source voltage through a rotary switch. As will be apparent to those skilled in the art, a three-phase fan could be used. In that case, it would require a controller. The direct current controller 22 preferably receives input from a rotary switch 52, which is mounted to the rear end 30 of the blower housing 26. The rotary switch 52 is a high-speed DC voltage switch, which yields a voltage that is equal to the source voltage used to power the DC brushless fan motors, and commands the controller 22 to run the compressor 38.

The condenser 40 is mounted to the base, along a length thereof. A reversing valve 54 and a solenoid valve 56 are preferably connected to the evaporator 16, the compressor 38 and the condenser 40. The reversing valve 54 enables the universal direct current brushless air conditioning system 1 to be used as a heat pump, to enable the output of a heated flow of air. An air dryer 58 is preferably connected to an outlet tube of the condenser 40. However, as will be apparent to those skilled in the art, the air dryer 58 could be integrated anywhere within the unit. The connections between the evaporator 16, the compressor 38, the condenser 40 and the reverse valve 54 are well known in the air condition art, and need not be explained in detail.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A universal direct current brushless air conditioning system, comprising:
    a blower unit including an evaporator, at least one inlet fan and at least one outlet vent, said at least one inlet fan directing a flow of air across the evaporator and through the at least one outlet vent; and
    a compressor unit including a compressor, a condenser, and two exhaust fans, said exhaust fans pulling air through the condenser and over the compressor for cooling, one of said exhaust fans being mounted to one end of the compressor enclosure and a second exhaust fan being mounted to the other end thereof, said compressor being mounted between said fans, wherein said blower unit is mounted in one area of a vehicle and said compressor unit is mounted to another area of the vehicle.

2. The universal direct current brushless air-conditioning system of claim 1, wherein said compressor is hermetically sealed and has a DC brushless compressor motor.

* * * * *